(12) United States Patent
Keller et al.

(10) Patent No.: US 6,799,697 B1
(45) Date of Patent: Oct. 5, 2004

(54) AIR INJECTOR APPARATUS

(76) Inventors: Elbert G. Keller, 4745 Moorpark Ave., Apt. 12, Moorpark, CA (US) 93021; James P. Sandoval, 8333 Happy Camp, Moorpark, CA (US) 93021

( * ) Notice: Subject to any disclaimer, the term of this patent is extended or adjusted under 35 U.S.C. 154(b) by 54 days.

(21) Appl. No.: 10/372,869

(22) Filed: Feb. 24, 2003

(51) Int. Cl.$^7$ ............................................... B67D 5/00
(52) U.S. Cl. ...................... 222/5; 222/189.06; 222/190; 141/67; 141/95
(58) Field of Search .................... 222/3, 5, 189.06, 222/189.11, 190; 141/67, 95

(56) References Cited

U.S. PATENT DOCUMENTS

| | | | |
|---|---|---|---|
| 4,289,225 A | * 9/1981 | Scholta | 194/241 |
| 4,702,396 A | * 10/1987 | Gwiazda | 222/152 |
| 4,745,730 A | 5/1988 | Bartle, Sr. | |
| 4,869,407 A | * 9/1989 | Booth et al. | 222/3 |
| 5,195,427 A | 3/1993 | Germano | |
| 5,388,762 A | * 2/1995 | Bryson, Sr. | 239/56 |
| 5,765,608 A | 6/1998 | Kristen | |
| 5,988,161 A | * 11/1999 | Kroll | 128/202.12 |
| 6,036,054 A | * 3/2000 | Grill | 222/3 |
| 6,119,738 A | * 9/2000 | Idol | 141/114 |
| 6,477,920 B1 | * 11/2002 | Yang | 81/3.2 |
| 6,530,401 B1 | * 3/2003 | Angehrn et al. | 141/64 |
| 6,598,626 B2 | * 7/2003 | Chaffee | 141/65 |
| 6,626,092 B2 | 9/2003 | Tarlow | |

* cited by examiner

Primary Examiner—Joseph A. Kaufman
(74) Attorney, Agent, or Firm—Jack C. Munro

(57) ABSTRACT

A handheld air injector apparatus that is to be used in conjunction with an airtight closeable container where the injector apparatus is to connect with a container and supply air within the container to a preselected level.

7 Claims, 3 Drawing Sheets

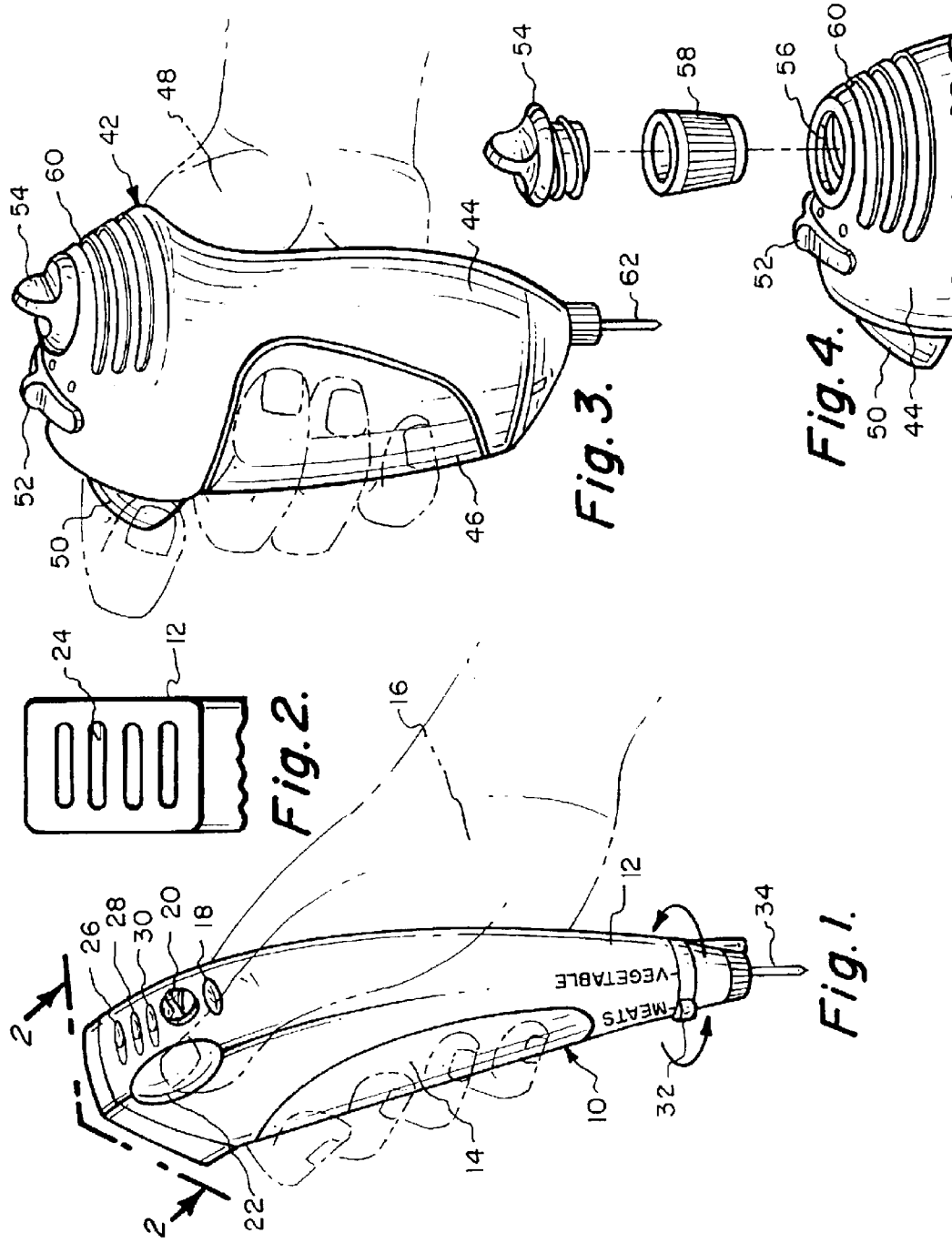

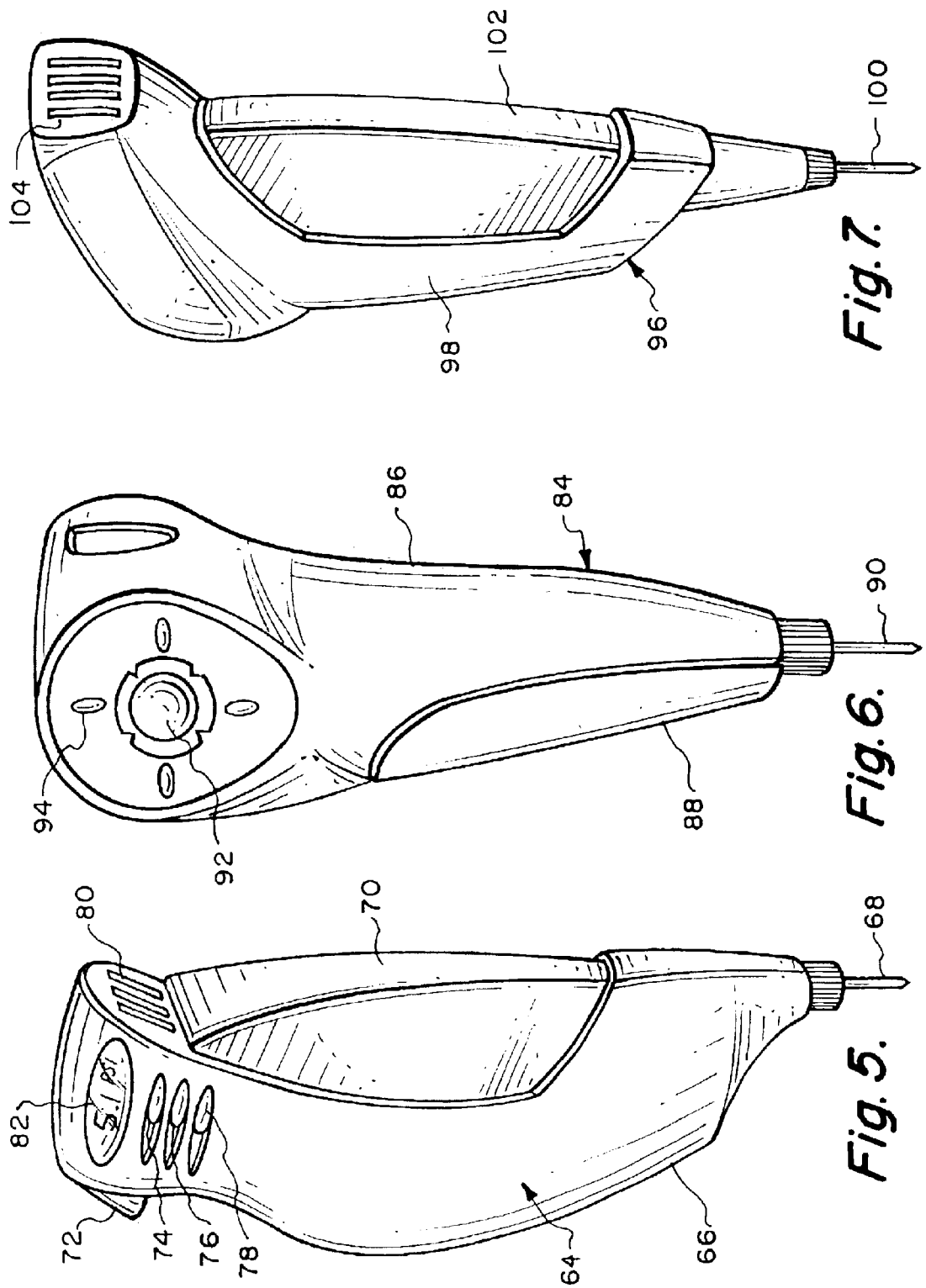

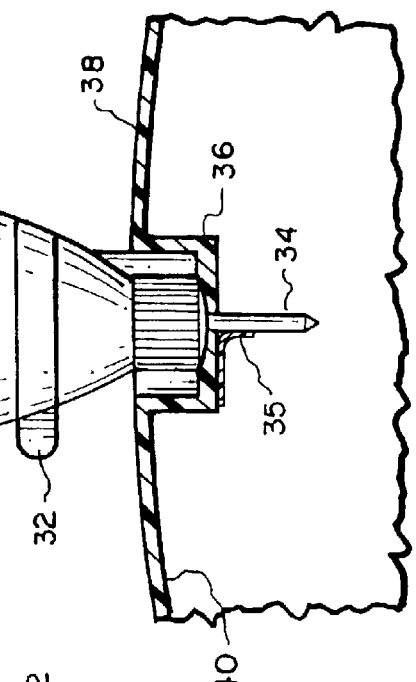
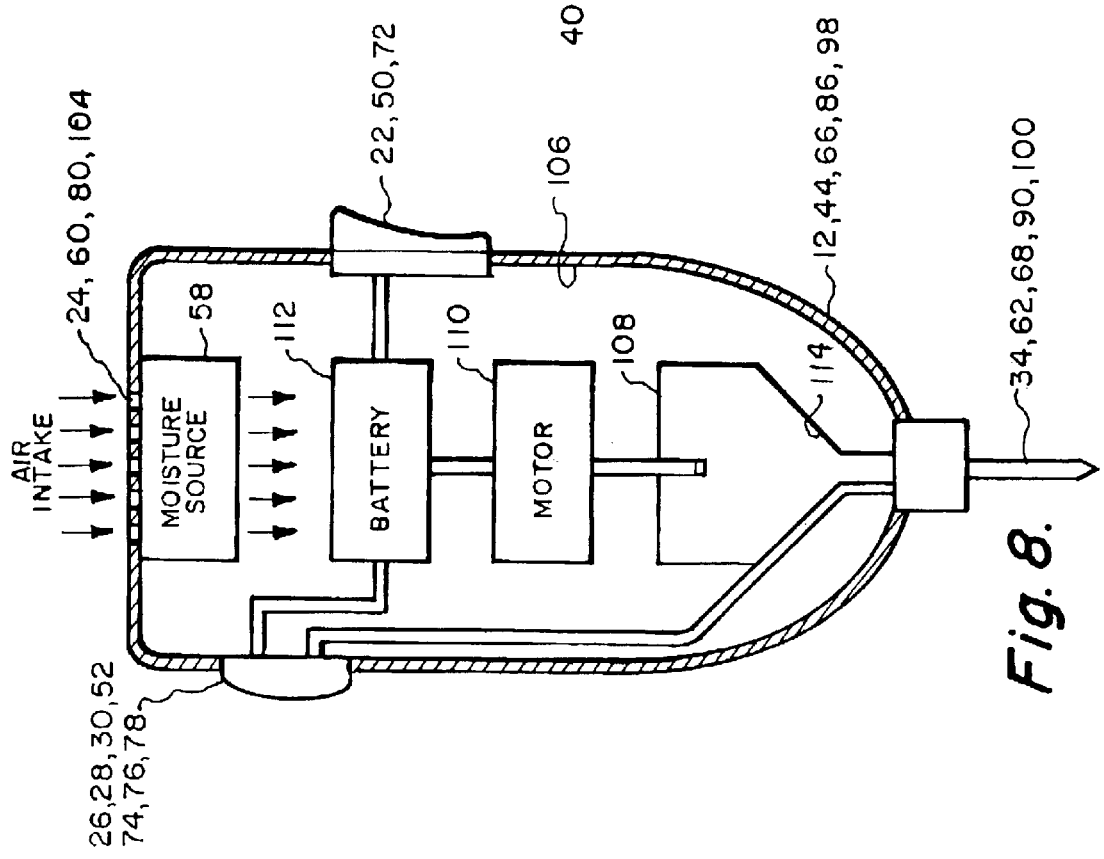

AIR INJECTOR APPARATUS

BACKGROUND OF THE INVENTION

1. Field of the Invention

The field of this invention relates to a handheld air injector apparatus that is to be usable with a container which has a controlled pressurized atmosphere that surrounds a foodstuff that is stored within the container for the purpose of retaining freshness of the foodstuff.

2. Description of the Related Art

Foodstuffs, principally produce such as fruits and vegetables, assimilate carbon dioxide, water and other chemicals in their growth. This invention will be described primarily in relation to produce. However, this invention will also work for meats and flowers. Carbon dioxide, water and chemicals are nutrients that are energy sources for all living organisms. In relation to plants, this process is called photosynthesis which also releases oxygen into the atmosphere. Produce cells respire. Cellular respiration comprises a sequence of chemical reactions wherein oxygen is used in the breakdown of glucose generating energy which is usually manifested as heat and exhaling carbon dioxide. The surface of the foodstuff of the product is a porous barrier through which the foodstuff breathes. Inside the barrier, the relative humidity is almost one-hundred percent while outside the barrier the ambient relative humidity is generally lower. This relative humidity gradient causes a partial vapor pressure gradient from inside the product to the outside, forcing water, oxygen and nutrients to leave the foodstuff resulting in drying and deterioration of the foodstuff. It has been known in the past that the rate of cellular maturity is a exponential function of respiration rate. Thus, an increase in pressure is known to retard foodstuff respiration.

In storing food within a household, the primary concern is to the freshness of the food. To maintain freshness in the past, two main methods have been employed. The first method is refrigeration and the second is containment. Refrigeration is the providing of a reduced temperature environment. The containment is to supply containers within which the foodstuff is to be located. The containers, of course, are to be stored within the refrigerated environment. The purpose of the containment is to seal the foodstuff against air exchange with the ambient environment.

It would be most desirable to provide a container that could be utilized to substantially increase the time that a foodstuff can be stored while yet maintaining the freshness of the foodstuff. For a consumer to be able to store a foodstuff and maintain such fresh over an extended period of time provides a significant advantage in that immediate shopping for foodstuffs is not necessarily required and spoilage rates for foodstuffs are substantially diminished. Also, if foodstuffs can be retained for an extended period of time, possibly canning and freezing techniques could be diminished or eliminated altogether.

It is necessary for the purpose of providing widespread use of pressurized containers for storing of foodstuffs that an injector for supplying of the pressurized air with water vapor within the container be supplied that is convenient to use, inexpensive to manufacture and is non-complex in usage. It is believed that these advantages are obtained with usage of the injector apparatus of the present invention.

SUMMARY OF THE INVENTION

A basic embodiment of air injector apparatus for injecting a pressurized fluid within a closed container for causing a foodstuff contained within the container to have an extended shelf life where the apparatus includes a hand holdable housing. A dispensing needle is attached to the housing with the dispensing needle adapted to engage with an injection port mounted on an enclosed airtight container which is to contain the foodstuff. This dispensing needle is to dispense pressurized air within that container. There is a pressure adjustment mounted on the housing with this pressure adjustment being manually selectable to select a maximum pressure level of the air that is to be supplied within the container. A switch is mounted on the housing with this switch being manually actuatable to cause the air to be dispensed from the dispensing needle.

A further embodiment of the present invention is where the basic embodiment is modified by the pressure adjustment means being defined as two separate switches with each switch to be selectable to a maximum pressure value.

A further embodiment of the present invention is where the basic embodiment is modified by the maximum pressure values being defined as three pounds and five pounds per square inch of differential pressure.

A further embodiment of the present invention is where the basic embodiment is modified by the apparatus including a moisture supply chamber with this moisture supply chamber being mounted within the flowpath of the air so that moisture laden air will be dispensed from the dispensing needle.

A further embodiment of the present invention is where the just previous embodiment is modified by the moisture supply chamber being defined to include the removable filter cartridge which is designed to be soaked with water and with air to be passed through the filter cartridge in the flowpath within the housing in order to humidify the air that is to be dispensed from the dispensing needle.

A further embodiment of the present invention is where the basic embodiment is modified by there being included an altitude adjustment in conjunction with the housing. The altitude adjustment is to be manually moved to different positions with each position corresponding to a particular geographical elevation which will correspond to the geographical elevation of usage.

A further embodiment of the present invention is where the just previous embodiment is modified by including an altitude adjustment to adjust for altitude between sea level and ten thousand feet.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is an isometric view of a first embodiment of air injector apparatus of the present invention showing the air injector apparatus being held in the position for usage;

FIG. 2 is a back end view of the air injector apparatus of FIG. 1 taken along line 2—2 of FIG. 1 showing the air inlet arrangement for the apparatus;

FIG. 3 is an isometric view of a second embodiment of injector apparatus of the present invention showing the apparatus being held within a user's hand, which would be the typical position of usage;

FIG. 4 is an exploded isometric view of a portion of the second embodiment of injector apparatus of FIG. 3 showing the moisture supply arrangement utilized to add humidity to the air flow path passing through the second embodiment of apparatus;

FIG. 5 is an isometric view of yet a third embodiment of air injector apparatus of the present invention;

FIG. 6 is an isometric view of a fourth embodiment of air injector apparatus of the present invention;

FIG. 7 is an isometric view of a fifth embodiment of air injector apparatus of the present invention;

FIG. 8 is a diagrammatic longitudinal cross-sectional view depicting the inner mechanism within any one of the embodiments of air injector apparatus of the present invention; and FIG. 9 is a cross-sectional view showing the dispensing needle section of any one of the embodiments of air injector apparatus of the present invention showing the position of the air injector apparatus in conjunction with an injection port of a pressurized container.

DETAILED DESCRIPTION OF THE INVENTION

Referring particularly to FIG. 1, there is shown a first embodiment 10 of air injector apparatus for injecting of a pressurized fluid within a closed container. The first embodiment 10 includes a sheet material housing 12. Housing 12 has molded therein a handgrip 14. Handgrip 14 will generally be a rubber or some other resilient material that is to provide comfort when a user grasps the housing 12 by his or her hand 16. Mounted on the exterior surface of the housing 12 is a pressure level display window 18. Also mounted on the housing 12, directly adjacent the window 18, is a knob 20. Also mounted on the exterior surface of the housing 12 is a button 22. Button 22 is to be pressable in order to activate the first embodiment 10 of air injector apparatus of this invention.

The back surface of the housing 12 is formed into a ventilation grate 24. The grate 24 is to provide entry of air to within the interior of the housing 12. Also mounted on the exterior surface of the housing 12 is a slide switch 26. The slide switch 26 is to be movable at least to two different positions and possibly three or more. In one position, which will be defined as the left position, the slide switch 26 is to be set in that position when the environment of usage of the first embodiment 10 is at sea level. Let it be assumed that the right position of the slide switch 26 is where the environment of usage is at a much higher elevation, such as a mile above sea level. The pressure level in the display window 18 will generally range between zero and six pounds per square inch. The pressure level displayed in the window 18 will take into consideration the elevation of usage. Generally, the pressure level will rarely exceed five to six pounds of pressure in the window 18. The barometric of Denver, Colo. is about three pounds per square inch less than at sea level. Mexico City is about four pounds less than sea level. By moving of the slide switch 26, the first embodiment 10 can be adjusted at a zero pressure in the window 18 at its particular altitude of usage. If it was not adjusted, there would be a three pound per square inch reading in window 18 in Denver, Colo. and a four pound reading in window 18 in Mexico City. It just makes it convenient for the user to start at zero in the particular elevation where the injector is being used. It is to be understood that the slide switch 26 can actually have numerous different settings, for example, at thousand foot increments of elevation.

For most fruits that are being stored, a three pound differential pressure will be adequate. There can be incorporated a slide switch 28 which could be adjusted to that three pound value. This will not permit the injector to inject a pressure greater than that three pound value. For some vegetables, it is desired that a higher pressure be used, such as five pounds per square inch. For that purpose, a slide switch 30 could be moved which could limit the amount of pressure that could be emitted from the injector to five pounds per square inch.

Instead of slide switches 28 and 30, there may be used a single slide switch 32. The slide switch 32 could be adjusted to different positions, such as for fruits, vegetables and even meats. Generally, when the slide switch 32 is in the position of meats, that will permit the injector to inject the maximum amount of pressure which may actually even exceed six pounds per square inch.

The front end of the housing 12 of the first embodiment 10 includes an injector needle 34. Referring particularly to FIG. 9, the injector needle is to be pushed through an injector port 36 of a container 38. The injector port has a hole which is normally closed by a flap valve 35. Inserting of needle 34 into the port 36 displaces the flap valve 35. When needle 34 is withdrawn, the flap valve 35 again closes the hole. The fruit, vegetable or meat, which is not shown, is to be stored within the internal chamber 40 of the container 38.

Referring particularly to FIG. 3, there is shown a second embodiment 42 which has a housing 44. The housing 44 includes a handgrip 46 which is basically similar to handgrip 14. The housing 44 is to be held by the handgrip 46 by means of a user's hand 48. Mounted on the housing 44 is an operation switch 50. Also mounted on the housing 44 is a pressure adjust slide switch 52 which is to be movable to various altitude positions. There is included also in the housing 44 a knob 54 which is basically similar to previously described knob 20. The knob 54 can be basically unscrewed from a cavity 56. Within the cavity 56 is to be located a filter unit 58. The filter unit 58 is capable of containing a quantity of water with the air passing through the ventilation openings 60 to be conducted through the filter unit 58 so that the air that is dispensed from the needle 62 will include moisture. The use of moisturized air in the preserving of fruits, vegetables and meats is desirable. A presoaked with water tissue could be inserted within the filter unit 58.

Referring particularly to FIG. 5, there is a third embodiment 64 of injector of this invention. Third embodiment 64 has a housing 66 which is yet of a different configuration than the previously discussed housings 12 and 44. The front end of the housing 66 includes an injector needle 68. Mounted within the housing 66 is a handgrip 70. The housing 66 also has an operational activating switch 72 which is basically similar to switches 22 and 50. Also mounted within the housing 66 are slide switches 74, 76 and 78 which are basically similar to previously discussed slide switches 26, 28 and 30. Included within the housing 66 are ventilation openings 80 which are basically similar to previously described ventilation openings 24 and 60. Also included within the housing 66 is a pressure display window 82. The pressure that is being produced within the container 38 will be displayed within the window 82.

Referring particularly to FIG. 6, there is shown a fourth embodiment 84 of this invention. The fourth embodiment 84 has a housing 86 within which is formed a handgrip 88. The front end of the housing 86 connects to a dispensing needle 90. Mounted within the housing 86 is a dial switch 92. The dial switch 92 is to be turned to the different selected pressure levels which will be indicated at indicators 94.

Referring particularly to FIG. 7, there is shown a fifth embodiment 96 of injector of this invention. The fifth embodiment 96 includes a housing 98. From the front end of the housing 98 extends an injector needle 100. Formed within the housing 98 is a handgrip 102. Formed within the housing 98 are a series of ventilation openings 104. There will be included appropriate switching means to dial a particular selected pressure, which is not shown.

Referring particularly to FIG. 8 of the drawings, there is diagrammatically shown the internal mechanism contained within each of the housings 12, 14, 66, 86 and 98. Internally of each of these housings is an internal chamber 106. Mounted within internal chamber 106 is a pump 108. The pump 108, which will probably comprise a piston and cylinder, is to be operationally driven by a motor 110. The motor 110 is to be operationally driven by battery 112. The buttons 22, 50 and 72 are connected through a controller, which is not shown, to the battery 112. Pushing of the buttons 22, 50 and 72 will cause the motor 110 to be turned on. The turning on of the motor 110 will cause the pump 108 to be operated and moisture ladened air will then be pushed through chamber 114 to be dispensed exteriorly to the needle 34, 62, 68, 90 or 100. The pressure that is produced within the container 38 is to be fed back through the pressure select switches 26, 28, 30, 52, 74, 76 and 78 to the controller. The pressure level that is ascertained within the internal chamber 40 of the container 38 will then be displayed within the display window, such as display windows 18 and 82. The air that is sucked in through the ventilation openings 24, 60, 88 and 104 will be transmitted through the filter unit 58 to then be conducted within the chamber 114.

What is claimed is:

1. A air pressure apparatus for injecting a pressurized fluid within a closed container for causing a foodstuff contained within the container to have an extended shelf life, said apparatus comprising:

a hand holdable housing;

a dispensing needle attached to said housing, said dispensing needle adapted to engage with an injection port mounted on an enclosed airtight container which is to contain the foodstuff, said dispensing needle to dispense pressurized air within the container;

pressure adjustment means mounted on said housing, said pressure adjustment means being manually selectable to select a maximum pressure level of the air within the container; and a switch mounted on said housing, said switch being manually actuatable to cause the air to be dispensed from said dispensing needle.

2. The air injector apparatus as defined in claim 1 wherein:

said pressure adjustment means including at least a pair of switches with each said switch being setable to a different maximum pressure value.

3. The air injector apparatus as defined in claim 2 wherein:

each said maximum pressure value being three pounds and five pounds per square inch in differential pressure.

4. The air injector apparatus as defined in claim 1 wherein:

said apparatus including a moisture supply chamber included within said housing, said chamber to be supplied a quantity of water, said housing having a pressurized air path, the moisture supply chamber being within the confines of said path, thereby moisture is being supplied to the air before it is dispensed through said dispensing needle.

5. The air injector apparatus as defined in claim 4 wherein:

said moisture supply chamber being connectable with a removable filter cartridge, said filter cartridge designed to be soaked with water prior to being installed in conjunction with supply chamber, said filter cartridge to be removable to be resoaked and then reinstalled in conjunction with said supply chamber.

6. The air injector apparatus as defined in claim 1 wherein:

altitude adjustment means mounted on said housing, said altitude adjustment means to be movable to different positions with each said position to correspond to a particular altitude for a geographical location where said apparatus is being used.

7. The air injector apparatus as defined in claim 6 wherein:

said altitude adjustment means to be able to adjust for any altitude between sea level and ten thousand feet.

* * * * *